Nov. 27, 1951 W. H. HEWITT, JR 2,576,835
FLEXIBLE WAVE GUIDE
Filed Dec. 31, 1946
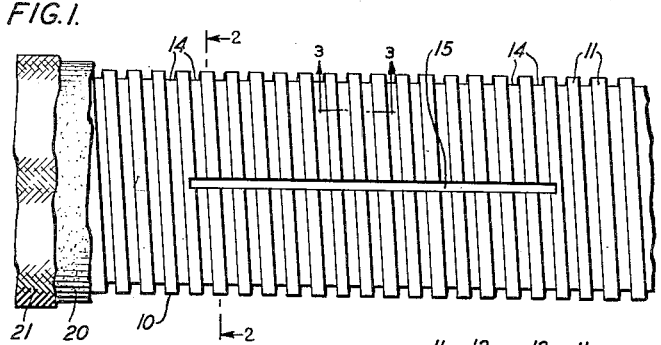
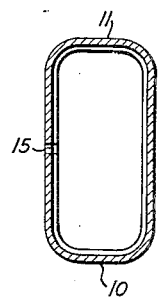
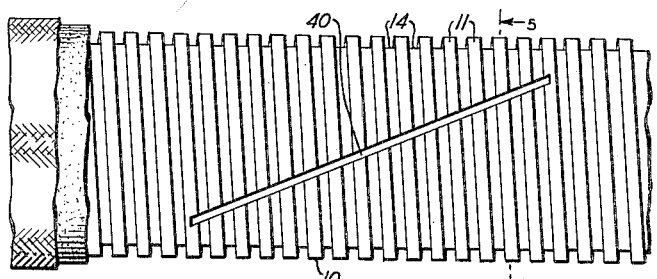
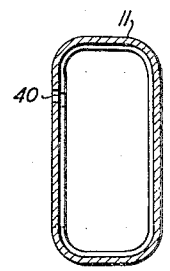
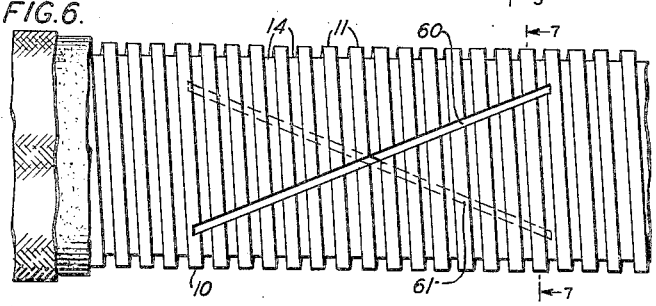
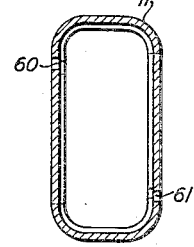
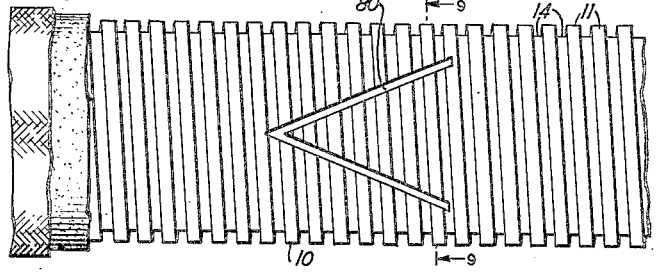
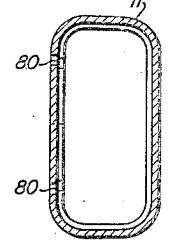
INVENTOR
W.H. HEWITT, JR.
BY
ATTORNEY Patented Nov. 27, 1951

2,576,835

UNITED STATES PATENT OFFICE 2,576,835

FLEXIBLE WAVE GUIDE

William H. Hewitt, Jr., Mendham, N. J., assignor to Bell Telephone Laboratories, Incorporated, New York, N. Y., a corporation of New York Application December 31, 1946, Serial No. 719,590

13 Claims. (Cl. 178—44)

This invention relates to a hollow wave guide having a rectangular cross-section and formed with an effective helical corrugation in both its inner and outer surfaces, and more specifically to an arrangement for improving the twistability of such wave guide.

Flexible wave guide of the corrugated type formed into a hollow rectangular configuration is readily adaptable for use in locations where it is necessary to twist the wave guide in order to connect two spaced points, off-set in different planes, in a line transmitting signal waves having a wavelength of one meter or less. Such flexible wave guide may comprise a structure in which each convolution is soldered to adjacent convolutions, or a structure in which each convolution is movable relative to adjacent convolutions. It may happen that the wave guide may tend to change its rectangular cross-section during the introduction of the twist therein, depending on the ability of the wave guide to accommodate the amount and complexity of such twist. As a consequence of the twist, the attenuation of the twisted wave guide may tend to be increased substantially over what it was before the introduction of the twist therein. A substantial increase in the attenuation of twisted flexible wave guide may be undesirable in a transmission system for centimeter wave signals.

The present invention contemplates an arrangement for substantially improving the torsional flexibility of corrugated wave guide.

The object of the invention is to enable the introduction of a twist into corrugated flexible wave guide and at the same time to maintain the attenuation of the wave guide at a tolerable value.

In a specific embodiment the present invention comprises a known wave guide including a helical corrugation formed into a hollow rectangular configuration in which each convolution is soldered to adjacent convolutions, the wave guide having one side provided with an elongated slot extending longitudinally of the wave guide, transversely of the helical corrugation, and terminating a small distance from each end of the wave guide. In other embodiments the wave guide may have each of two opposite sides provided with an elongated or a V-shape slot.

The invention will be readily understood from the following detailed description taken together with the accompanying drawing in which:

Fig. 1 is a plan view of a flexible wave guide formed with a helical corrugation in both its inner and outer surfaces, and including a specific embodiment of the invention;

Fig. 2 is a view taken along line 2—2 of Fig. 1;

Fig. 3 is a view taken along the line 3—3 in Fig. 1; and

Figs. 4 through 9 delineate other embodiments of the invention using the wave guide of Fig. 1.

Referring to Figs. 1, 2 and 3 a known wave guide 10 is made by winding in adjacent turns an elongated element 11 of electrically conductive material formed with a bent portion 12 on its left-hand edge and a bent portion 13 on its right-hand edge as viewed in Fig. 3, both bent portions extending effectively in opposing relation and off-set from each other in a transverse direction. The element 11 is also formed substantially into a helix so that bent portions 12 and 13 of each convolution interlock with bent portions 13 and 12, respectively, on adjacent convolutions whereby a helical channel 14 is formed to extend throughout the length of the wave guide 10 on both the inner and outer surfaces thereof. This helix is substantially rectangular in cross-section having two opposite sides which are wider than the remaining two opposite sides. As thus arranged, the element 11 forms alternate ridges and grooves extending helically, as in the thread of a screw, in both the inner and outer surfaces of the wave guide to constitute effectively a helical corrugation in both of these surfaces. Solder applied in a suitable manner to the engaging portions 12 and 13 of adjacent convolutions tends to maintain the element 11 in the aforementioned helix. This wave guide may be embodied in a transmission line for signal waves whose wavelength is one meter or less.

In accordance with a specific embodiment of the invention as shown in Figs. 1 and 2, a narrow and elongated slot 15 is formed substantially in the center of one wide side of the wave guide 10, and extends entirely through the side of the wave guide. This slot is positioned substantially in the center of the one wide side of the wave guide along the longitudinal axis thereof to extend transversely of the effective helical corrugation in both the inner and outer surfaces of the wave guide, and terminates a small distance from each end of the wave guide. This distance as well as the width of the slot may be predetermined depending on the actual length of the wave guide and on the amount and complexity of the twist to be introduced therein. In twisting a hollow wave guide of the aforedescribed structure, it has been found that the twisting takes place without appreciably changing the cross-section of the wave guide because of the slot and the tendency of the individual convolutions of the helix to spread apart, the element 11 having such dimensions as to permit the springing-apart effect.

It was found, as one example, for a ⅝ inch by 1¼ inch wave guide comprising the structure shown in Figs. 1, 2 and 3 and having a length of the order of three feet, that a slot having a width of a few thousandths of an inch and terminating approximately one-half inch from each end of the wave guide was satisfactory to improve substantially the torsional flexibility of the wave guide when compared to wave guide having the movable convolutions as above-noted, and at the same time to limit the increase in attenuation approximately to 25 per cent of that existing in the same wave guide before the addition of the slot thereto.

Figs. 4 through 9 illustrate other embodiments of the invention for achieving the result obtained with Figs. 1, 2 and 3 as above explained. Figs. 4 and 5 show an elongated slot 40 formed in one wide side of the wave guide 10 and extending obliquely with reference to the longitudinal axis thereof. Figs. 6 and 7 are similar to Figs. 4 and 5, and show two slots 60 and 61 formed in the two wide sides of wave guide 10 and disposed in opposite oblique directions with reference to the longitudinal axis of the wave guide 10, the slot 60 being in the upper wide side and the slot 61 in the lower wide side. Figs. 8 and 9 show a substantially V-shape slot 80 formed in one wide side of wave guide 10, and positioned effectively along the longitudinal axis thereof. In Figs. 8 and 9, a second V-shape slot could be formed in the opposite wide side of wave guide 10, disposed in the same direction as or in a direction opposite to that of the V-shape slot 80 in the one side of the wave guide 10.

It will be understood that electrical leakage from the slotted wave guide may be substantially precluded by molding or otherwise applying a rubber cover 20 to the slotted wave guide, and then applying one or more layers of copper braiding 21 onto the outer surface of the rubber cover, the copper braiding being secured to the opposite ends of the wave guide. This would tend to reduce materially the 25 per cent increase in the attenuation of the wave guide caused by the introduction of the twist therein as previously mentioned.

It will be apparent to those skilled in the art that the above-noted slots may include configurations that are different from those described above and shown in the drawing and that will work equally as well for substantially improving the torsional flexibility of the wave guide and at the same time limiting the increase in the attenuation of the slotted wave guide; and further that two or more slots may be formed in the wall of each wave guide as determined by specific uses.

What is claimed is:

1. A flexible hollow wave guide for transmitting microwave signals, said guide comprising a conductive element formed in a helix having substantially a rectangular cross-section of certain dimensions, said guide having a slot of preselected configuration and predetermined dimensions formed in a wall thereof substantially along the entire length of said guide, said slot enabling said guide to maintain substantially said rectangular cross-section of said certain dimensions when a curvature is introduced into said guide substantially along the entire length thereof.

2. A flexible unitary hollow wave guide for transmitting signal waves of ultra-high frequencies, said guide comprising a conductive element formed with alternate ridges and grooves extending helically to constitute substantially a rectangular cross-section of certain dimensions, said guide having a slot of preselected configuration and predetermined width formed in a wall of said guide, said slot extending substantially the entire longitudinal length of said guide, said slot enabling said guide to maintain substantially said rectangular cross-section of said certain dimensions when said guide is subjected to a torsional twist substantially along the entire longitudinal length thereof.

3. A flexible unitary hollow wave guide for transmitting microwave signals, said guide being formed substantially with a rectangular cross-section of certain dimensions and with an effectively helical corrugation in each of its inner and outer surfaces, said guide having a slot of preselected configuration and predetermined width formed in a wall thereof, said slot extending along an axis of said guide and terminating in proximity of each end thereof, said slot permitting said guide to maintain substantially said rectangular cross-section of said certain dimensions when said guide is twisted substantially along the entire length of said axis thereof.

4. A flexible hollow wave guide comprising a conductive element formed in a helix having a rectangular cross-section of certain dimensions, said guide having a slot of preselected configuration and predetermined dimensions formed in each of two opposite sides thereof, said slots enabling said cross-section to substantially maintain said certain dimensions when a curvature is introduced into said guide.

5. A flexible unitary hollow wave guide for transmitting microwaves, said guide comprising a conductive element formed in a helix having a rectangular cross-section of certain dimensions, said guide having at least one wall provided with a slot of preselected configuration and predetermined dimensions, said slot extending longitudinally of subsantially the entire length of said guide, said slot permitting said guide to maintain substantially said rectangular cross-section of said certain dimensions when a curvature is introduced into said guide substantially entirely longitudinally thereof.

6. A hollow wave guide according to claim 5 in which said guide has said one wall provided with said slot extending substantially along the entire longitudinal axis of said guide to terminate adjacent the opposite ends thereof, said slot permitting said guide to maintain substantially said rectangular cross-section of said certain dimensions when said curvature is introduced into said guide substantially along the entire longitudinal axis thereof.

7. A hollow wave guide according to claim 5 in which said guide includes said one wall provided with said slot extending obliquely with reference to the longitudinal axis of said guide.

8. A hollow wave guide according to claim 5 in which said guide has each of two opposite walls provided with said slot, and said slots have preselected configurations and predetermined dimensions and extend in opposite oblique directions with reference to the longitudinal axis of said guide.

9. A hollow wave guide according to claim 5 in which said guide has one side provided with said slot having a V-shape configuration, and said slot extends effectively along the longitudinal axis of said guide.

10. A hollow wave guide according to claim 5 in which said guide has said one wall provided with said slot formed with an elongated and relatively narrow configuration, and extending substantially the entire length of said guide to terminate adjacent the opposite ends thereof.

11. A hollow wave guide according to claim 5 in which said guide has each of two opposite walls provided with said slot having a V-shape configuration, and said slots extend effectively along the longitudinal axis of said guide.

12. A flexible unitary hollow wave guide for transmitting microwave signals, said guide having a rectangular cross-section of certain dimensions and formed with an effectively helical corrugation in each of its inner and outer surfaces, said guide having two opposite sides wider than the other two opposite sides, said guide having at least one wide side provided with a slot of preselected configuration and predetermined width, said slot extending substantially transversely of said corrugation and terminating in proximity of each end of said guide, said slotted wave guide having a covering comprising a layer of rubber, and at least one layer of copper braiding applied to said rubber, said slot enabling said guide to maintain substantially said rectangular cross-section of said certain dimensions when said guide is subjected substantially in its entirety to a torsional twist along an axis transverse substantially to said corrugation.

13. A flexible hollow wave guide for transmitting microwaves, said guide having a rectangular cross-section of certain dimensions, at least one wall of said guide having a slot, said slot being disposed and proportioned in said one wall to terminate in proximity of the ends thereof so as to enable said guide to substantially maintain said rectangular cross-section of said certain dimensions when said guide is twisted substantially along the entire length thereof.

WILLIAM H. HEWITT, JR.

REFERENCES CITED

The following references are of record in the file of this patent:

UNITED STATES PATENTS

| Number | Name | Date |
| --- | --- | --- |
| 1,198,391 | Brinkman | Sept. 12, 1916 |
| 1,811,816 | Blake | June 23, 1931 |
| 2,374,498 | Quayle | Apr. 24, 1945 |
| 2,403,289 | Korman | July 2, 1946 |
| 2,416,177 | Hollingsworth | Feb. 18, 1947 |
| 2,436,421 | Cork | Feb. 24, 1948 |

FOREIGN PATENTS

| Number | Country | Date |
| --- | --- | --- |
| 580,377 | Great Britain | Sept. 5, 1946 |

OTHER REFERENCES

"Introduction to Flexible Waveguides," published in the Radio Amateurs' Journal by Radio Magazines, Inc., 28 Renne Ave., Pittsfield, Mass. Published in November 1946. See pages 25, 26, 27, 59 and 60. Copy in 178–44.1D.